United States Patent Office 3,336,451
Patented Aug. 15, 1967

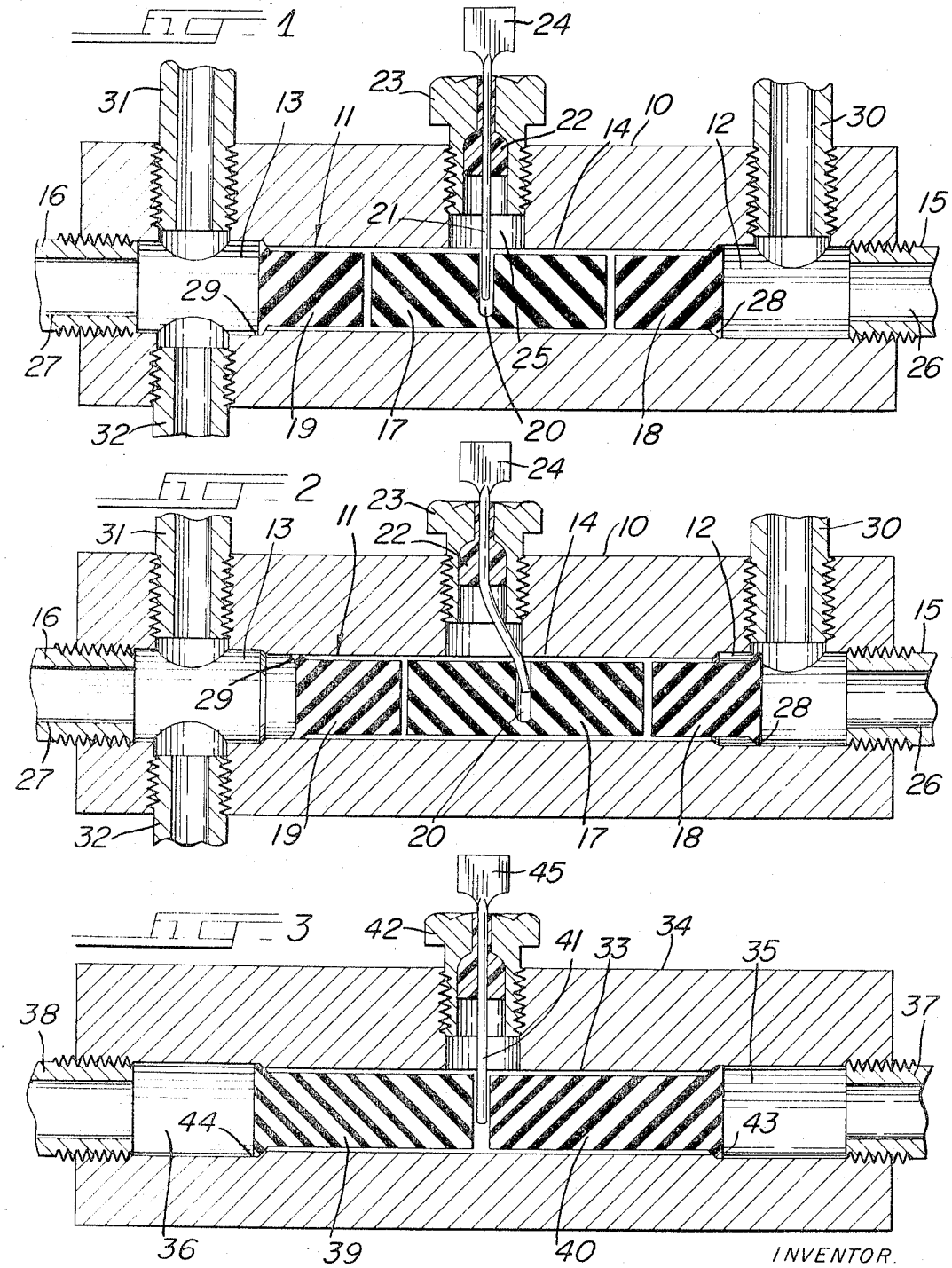

3,336,451
DEVICE FOR INDICATING A PREDETERMINED FLUID PRESSURE DIFFERENTIAL
William F. Burton, 56 Holmdene NE.,
Grand Rapids, Mich. 49503
Filed Mar. 21, 1966, Ser. No. 535,871
7 Claims. (Cl. 200—82)

This invention relates to the construction of devices for indicating the presence of a pressure differential between two hydraulic systems. It is currently becoming standard practice to separate the hydraulic system handling the rear wheels from that connected to the front wheels of automobiles. This safety feature practically eliminates the possibility of complete loss of brake action without warning. The most common cause of sudden loss of brake pressure is the rupture of the flexible conduits leading to the front wheels (which accommodate the steering action). With a single system, this event leaves the vehicle with nothing but its emergency brake, which is totally inadequate for control at high speeds. The sudden loss of brake action has caused many accidents, and the dual hydraulic system has now removed this danger.

Most automobiles will brake fairly well on the rear wheels alone, except in emergencies. It is thus possible for a driver to lose his front brake pressure without being aware of it. To alert him to the fact that he does not have full emergency brake action, some sort of warning device is necessary. Recognition of this problem is not new, and a variety of devices have been developed to show the loss of the pressure in a hydraulic system, either with respect to atmospheric pressure, or as a differential with respect to some other hydraulic system. The present invention acts as a result of a loss of balance of pressures between the two hydraulic systems serving the front and the rear wheels, respectively, and is intended to provide a signal as a function of a pressure differential between these systems. The resulting device may either be incorporated in the so-called brake "master cylinder," or may be installed as a separate device with connections to both the front and rear systems. While the preferred form of the invention has been developed in connection with automotive vehicles, several applications for essentially the same device have been found in other areas of machine design. It is quite common for the failure of one of several hydraulic systems to produce either a safety hazard or an operational difficulty, and the device provided by this invention is a very economical indicator that such conditions exist.

One of the very significant features of this invention is the fact that the device itself does not become a channel for the dissipation of the pressure from the good system over into the system that has ruptured. Provision is made by this invention for sealing off the pressure of the functioning system so that it does not bleed off through the indicating device, without requiring the presence of a diaphragm structure.

The several features of the invention will be analyzed in detail through a discussion of the particular embodiments illustrated in the accompanying drawing. In the drawing:

FIGURE 1 is a sectional elevation of one modification of the invention, illustrated in the neutral, or non-signalling condition.

FIGURE 2 is a sectional elevation showing the same device as in FIGURE 1, displaced under the presence of the pressure differential to produce a signal.

FIGURE 3 is a sectional elevation of a modified form of the invention.

Referring to FIGURES 1 and 2, the device illustrated in these views includes an electrically conductive block (usually a metal casting) 10 having the bore 11 extending throughout its length, and terminating in the portions 12 and 13 which are of slightly larger diameter than the central portion 14. The bore 11 is preferably on a single axis, and terminates in thread systems at its opposite ends for receiving the connection fittings 15 and 16, respectively. A three-piece piston assembly is normally received in the central portion 14, and includes the central element 17 and the end elements 18 and 19. The center element has a recess 20 for receiving the end of a flexible contact member 21, which is mounted in the insulating material 22 within the plug 23. The flexible member 21 extends through the insulating material to the exterior of the plug, and terminates in the "spade" terminal connection 24 where it is intended to be incorporated in an electric signal circuit of conventional design, which may include a sound device, dash panel light, or some other convenient form of signal indicator.

The plug 23 is in threaded engagement with the side opening 25, which communicates with the central bore 14. In the assembly of the piston elements 17, 18 and 19, it is necessary that the plug 23 be either absent or sufficiently displaced in an upward direction from the position shown in FIGURES 1 and 2 to remove the contact member 21 from the central bore 14. When the central piston member 17 is in the position shown in FIGURE 1, the plug 23 (including its contact member 21) can be screwed into the assembled position shown. The end piston elements 18 and 19 are slipped into place from opposite directions after the placement of the center element 17, and the connection fittings 15 and 16 form barriers to prevent subsequent movement of the outer piston elements completely out of the device. The inside diameters 26 and 27 of these fittings are inadequate to receive the piston elements 18 and 19.

The piston elements 18 and 19 are preferably identical, and are freely slidable within the bore 14, except for the annular flanges 28 and 29. The outer piston elements are preferably of a yieldable plastic, and the flanges 28 and 29 are capable of sufficient deformation under a threshold pressure force to permit the piston elements to be jammed into the central portion 14 of the bore. The presence of these flanges provides a threshold pressure differential which must be exceeded before the device will provide its warning signal. This is desirable, since it is quite common to encounter small and insignificant pressure differentials between front and rear pressure systems, and it is desirable that there be no signal until a serious differential has occurred. Under the latter conditions, the normal pressure balance between the bore portions 12 and 13 will be replaced by a sufficient differential to force the entire piston assembly to the left or to the right, depending upon the side that has failed. This condition is represented in FIGURE 2, which corresponds to a failure of pressure in the conduit 15. The movement of the entire piston assembly to the right has brought the contacting member 21 over to a position where it has grounded on the body casting 10, so that the warning circuit connected to the spade terminal 24 will signal this condition. It is very significant that the condition of the device in FIGURE 2 has produced a seal at the deformed flange 29, which prevents pressure from the conduit 16 from being dissipated. This feature is normally obtainable only in devices involving a diaphragm construction in which the opposite hydraulic systems are completely isolated by a resilient plate or sheet. It is also significant that the device will remain in the condition shown in FIGURE 2 until it has had the attention of a mechanic. In the course of repairing the hydraulic line that has ruptured, the mechanic will normally disconnect the fitting 15, and insert a suitable instrument in the bore 11 to shove the piston elements back to the FIGURE 1 position, thus restoring the non-indicating position of the flexible connector 21.

In the device shown in FIGURES 1 and 2, the fittings 15 and 16 represent supply connections from the master cylinder (not shown) to provide the pressure for the front and rear brake systems, respectively, with the conduit 30 normally extending back to a branch fitting connected to both of the rear brake cylinders. The connections to the front wheels are normally separated, and require the connections 31 and 32 for maximum installation convenience.

The modification shown in FIGURE 3 is arranged for single connections to each of the two hydraulic systems, and the bore 33 in the body unit 34 terminates in the end portions of enlarged diameter shown at 35 and 36, which are closed off by the connection fittings 37 and 38. The bore portions 35 and 36, as in connection with FIGURES 1 and 2, is of larger diameter than the central portion of the bore 33. In FIGURE 3, a two-piston assembly is used involving the identical elements 39 and 40. The end of the flexible conductor 41 is received between the ends of the piston elements 39 and 40, and movement of either of these into the central portion of the bore 33 will have the effect of grounding the conductor 41 against the conductive material of the body 34. The structure of the mounting plug 42 is the same as that of the plug 23, and the flanges 43 and 44 on the piston elements function in the same manner as the flanges 28 and 29. The piston elements 39 and 40 are also constructed of a plastic material which is capable of the resilient or deformable action shown in FIGURE 2. The spade terminal 45 is also connected into a convenient electrical warning circuit. In the FIGURE 3 modification, it is not necessary that the flexible conductor 41 be removed or laterally displaced to install the piston sections.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. A signal device for indicating a pressure differential between two fluid-pressure conduits, said device comprising:
   a conductive block having a hole opening at opposite sides of said block, said hole having a central portion of reduced diameter;
   detector means mounted in said block with a portion thereof having freedom of movement with respect thereto along the axis of said hole, said detector means projecting laterally into the said central portion;
   piston means slidably mounted in said central portion, and having portions on opposite sides of said detector means, said piston means being in separable sections including sections disposed at each of the opposite ends of said central hole portion and having a part thereof freely slidable within said central portion, and also having a deformable flange of greater initial diameter than that of said central portion normally disposed beyond the end of said central portion, said flange being receivable in said central portion under a force representing a predetermined pressure differential at opposite ends of said hole; and
   barrier means insertable in said block after said piston means sections to limit the movement thereof in said hole.
2. A device as defined in claim 1, wherein said detector means includes a deflectable electrically conductive arm mounted in insulating material.
3. A device as defined in claim 2 wherein said insulating material is carried in a plug removeably engaged in a lateral box in said block, said bore communicating with said central hole portion.
4. A device as defined in claim 1, wherein said piston flanges are freely received in the end portions of said hole.
5. A device as defined in claim 1, wherein said barrier means includes conduit connector fittings.
6. A device as defined in claim 1, wherein said hole is on a single axis.
7. A device as defined in claim 1, wherein said piston means is a pair of oppositely-facing sections, with said flanges disposed at the outer extremities thereof.

References Cited
UNITED STATES PATENTS

| | | | |
|---|---|---|---|
| 2,121,433 | 6/1938 | Kettunen | 200—82 |
| 2,258,334 | 10/1941 | Miller | 200—61.24 |
| 2,535,940 | 12/1950 | Malvin | 200—82 |

BERNARD A. GILHEANY, *Primary Examiner.*

H. BROOME, *Assistant Examiner.*